US012658841B2

(12) United States Patent
Thomsen et al.

(10) Patent No.: US 12,658,841 B2
(45) Date of Patent: Jun. 16, 2026

(54) MASS INERTER FOR SOLAR TRACKERS

(71) Applicant: Nextpower LLC, Fremont, CA (US)

(72) Inventors: Andrew Thomsen, Gilbert, AZ (US);
Jacob Mark Morin, Phoenix, AZ (US);
Tushar Kanti Guha, Milpitas, CA
(US); Ricardo Delgado-Nanez, San
Jose, CA (US)

(73) Assignee: NEXTPOWER LLC, Fremont, CA
(US)

( * ) Notice: Subject to any disclaimer, the term of this
patent is extended or adjusted under 35
U.S.C. 154(b) by 0 days.

(21) Appl. No.: 18/626,523

(22) Filed: Apr. 4, 2024

(65) Prior Publication Data

US 2024/0339959 A1 Oct. 10, 2024

Related U.S. Application Data

(60) Provisional application No. 63/456,998, filed on Apr.
4, 2023.

(51) Int. Cl.
*H02S 20/32* (2014.01)
*F24S 30/00* (2018.01)

(52) U.S. Cl.
CPC ........... *H02S 20/32* (2014.12); *F24S 2030/19*
(2018.05)

(58) Field of Classification Search
None
See application file for complete search history.

(56) References Cited

U.S. PATENT DOCUMENTS

| | | | |
|---|---|---|---|
| 10,107,347 B2 | 10/2018 | Fox et al. | |
| 2015/0372636 A1* | 12/2015 | Menard | F24S 25/50 |
| | | | 136/246 |
| 2023/0198458 A1* | 6/2023 | Mouniandy | H02S 30/10 |
| | | | 136/246 |

FOREIGN PATENT DOCUMENTS

| | | |
|---|---|---|
| CN | 104214295 A | 12/2014 |
| CN | 106487322 A | 3/2017 |
| CN | 108988759 A | 12/2018 |

(Continued)

OTHER PUBLICATIONS

Zhang, Shen et al., "A Survey of Electric Drives for Solar Tracking
Control of Concentrated Solar Power Heliostats," IECON 2019—
45th Annual Conference of the IEEE Industrial Electronics Society,
Lisbon, Portugal, 2019, pp. 2288-2294, doi: 10.1109/IECON.2019.
8927103. (Year: 2019).*

(Continued)

*Primary Examiner* — Tamir Ayad
(74) *Attorney, Agent, or Firm* — Fredrikson & Byron,
P.A.

(57) ABSTRACT

A solar tracking system includes a pier, a torque tube
rotatably supported on the pier, a solar module coupled to
the torque tube, wherein rotation of the torque tube effec-
tuates a corresponding rotation of the solar module, and an
inerter, the inerter including a drive gear couplable to the
torque tube, wherein rotation of the torque tube effectuates
movement of the drive gear, a drive gear operably coupled
to the drive gear, wherein movement of the drive gear
effectuates movement of the driven gear, and a flywheel
operably coupled to the driven gear, wherein movement of
the driven gear effectuates rotation of the flywheel, wherein
a wind loading on the solar module effectuates rotation of
the torque tube and a corresponding rotation of the flywheel, (Continued)

where rotation of the flywheel stores kinetic energy to mitigate excitation of the solar tracker.

9 Claims, 7 Drawing Sheets

(56) References Cited

FOREIGN PATENT DOCUMENTS

| | | | | | | |
|---|---|---|---|---|---|---|
| CN | 115480593 | A | | 12/2022 | | |
| DE | 102017203714 | A1 | | 9/2018 | | |
| EP | 1402327 | A1 | | 3/2004 | | |
| KR | 20100081616 | A | * | 7/2010 | ............. | H02S 20/32 |
| KR | 20100087594 | A | * | 8/2010 | ............. | H02S 40/22 |

OTHER PUBLICATIONS

Machine translation of KR 20100081616 A (Year: 2010).*
Machine translation of KR20100087594A (Year: 2010).*
Machine translation of CN 108988759A (Year: 2018).*
International Searching Authority "International Search Report and Written Opinion" From Application No. PCT/US2024/022945, Mailed Jun. 25, 2024, pp. 18.

* cited by examiner

MASS INERTER FOR SOLAR TRACKERS

RELATED APPLICATIONS

This application claims the benefit of U.S. Provisional Patent Application No. 63/456,998, filed Apr. 4, 2023, the entire contents of which are incorporated herein by reference.

FIELD

The present disclosure relates to solar power generation systems, and more particularly, to damping systems and methods for increasing solar tracker stability due to wind loads.

BACKGROUND

Solar cells and solar panels are most efficient in sunny conditions when oriented towards the sun at a certain angle. Many solar panel systems are designed in combination with solar trackers, which follow the sun's trajectory across the sky from east to west in order to maximize the electrical generation capabilities of the systems. The relatively low energy produced by a single solar cell requires the use of thousands of solar cells, arranged in an array, to generate energy in sufficient magnitude to be usable, for example as part of an energy grid. As a result, solar trackers have been developed that are quite large, spanning hundreds of feet in length and including hundreds to thousands of individual solar modules that are mechanically coupled to support structures.

Tortional excitation caused by wind loading exerts significant force upon the structure for supporting and the mechanisms for articulating the solar tracker. As such, increases in the size and number of components to reduce torsional excitation are required at varying locations along the length of the solar tracker. With these concerns in mind prior systems have typically drive the solar modules to a position where the loads created by the wind are reduced, but these typically come at the cost of energy production. For example, one methodology drives all of the solar trackers to a flat or 0 angle position relative to the ground. As can be appreciated, this significantly reduces the amount of energy being produced. The present disclosure seeks to address the shortcomings of prior tracker systems.

SUMMARY

In accordance with an aspect of the present disclosure, a solar tracking system includes a pier, a torque tube rotatably supported on the pier, a solar module coupled to torque tube, wherein rotation of the torque tube effectuates a corresponding rotation of the solar module, and an inerter including a drive gear couplable to the torque tube, wherein rotation of the torque tube effectuates movement of the drive mechanism, a driven mechanism operably coupled to the drive mechanism, wherein movement of the drive mechanism effectuates movement of the driven mechanism, and a flywheel operably coupled to the driven mechanism, wherein movement of the driven mechanism effectuates rotation of the flywheel, wherein a wind loading on the solar module effectuates rotation of the torque tube and a corresponding rotation of the flywheel, wherein rotation of the flywheel stores kinetic energy to mitigate excitation of the solar tracker.

In aspects, the drive mechanism is a drive gear and the driven mechanism is a driven gear.

In aspects, the drive gear and the driven gear may define a gear ratio that is greater than 1:1.

In certain aspects, the drive gear may define a generally triangular profile having an arcuate side surface, the arcuate side surface defining a plurality of teeth engageable with the driven gear.

In other aspects, the drive gear may be a gear rack, wherein linear motion of the gear rack effectuates movement of the driven gear.

In aspects, the drive gear may be a ball screw, wherein linear motion of the ball screw effectuates movement of the driven gear.

In other aspects, the solar tracking system may include a plurality gears, the plurality of gears in mechanical communication with the drive gear and the flywheel, such that rotational speed of the flywheel is greater than a rotational speed of the drive gear.

In certain aspects, the driven gear may be supported on the pier.

In aspects, the flywheel may be rotatably supported on the pier.

In accordance with another aspect of the present disclosure, an interter for a solar tracker includes a drive gear couplable to a torque tube, wherein rotation of the torque tube effectuates movement of the drive gear, a driven gear operably coupled to the drive gear, wherein movement of the drive gear effectuates movement of the driven gear, and a flywheel operably coupled to the driven gear, wherein movement of the driven gear effectuates rotation of the flywheel to store kinetic energy to mitigate excitation of a solar tracker.

In aspects, the drive gear and the driven gear may define a gear ratio that is greater than 1:1.

In other aspects, the drive gear may define a generally triangular profile having an arcuate side surface, the arcuate side surface defining a plurality of teeth engageable with the driven gear.

In certain aspects, the drive gear may be a gear rack, wherein linear motion of the gear rack effectuates motion of the driven gear.

In other aspects, the drive gear may be a ball screw, wherein linear motion of the ball screw effectuates movement of the driven gear.

In aspects, the inerter may include a plurality of gears, the plurality of gears in mechanical communication with the drive gear and the flywheel, such that a rotational speed of the flywheel is greater than a rotational speed of the drive gear.

In accordance with another aspect of the present disclosure, an inerter for a solar tracker includes a drive gear couplable to a torque tube, the torque tube rotatably supported on a pier, wherein rotation of the torque tube effectuates linear movement of the drive gear, a flywheel rotatably supported on the pier and operably coupled to the drive gear, wherein linear movement of the drive gear effectuates rotation of the flywheel, wherein rotation of the flywheel stores kinetic energy to mitigate excitation of a solar tracker.

In aspects, the drive gear may be a gear rack, the gear rack defining a plurality of teeth engageable with the flywheel.

In other aspects, the drive gear may be a ball screw, the ball screw defining threads engageable with the flywheel.

In aspect, the flywheel may be a ball screw nut threadably coupled to the ball screw.

In certain aspects, the inerter may include a gear train operably coupled to the drive gear and the flywheel, wherein the gear train includes a gear ratio that is greater than 1:1.

In aspects, the drive gear may be operably coupled to a portion of a solar module of the solar tracker, wherein a wind loading applied to the solar module effectuates rotation of the torque tube and linear movement of the drive gear.

The details of one or more examples are set forth in the accompanying drawings and the description below. Other features, objects, and advantages will be apparent from the description and drawings, and from the claims.

BRIEF DESCRIPTION OF DRAWINGS

Various aspects and features of the present disclosure are described hereinbelow with reference to the drawings, wherein.

DETAILED DESCRIPTION

Figure 1:
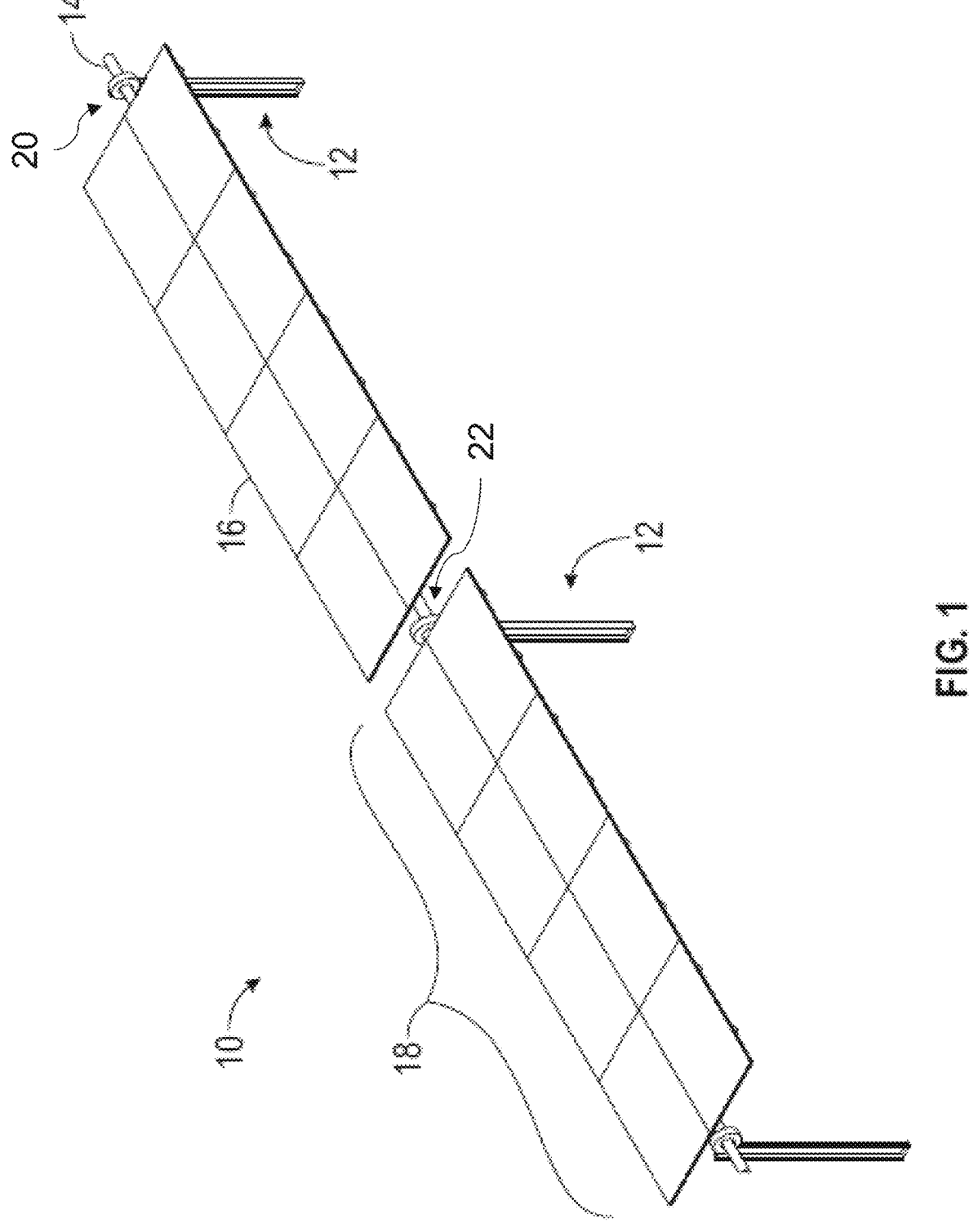
FIG. 1 is a perspective view of a solar tracker provided in accordance with the present disclosure.
Figure 2:
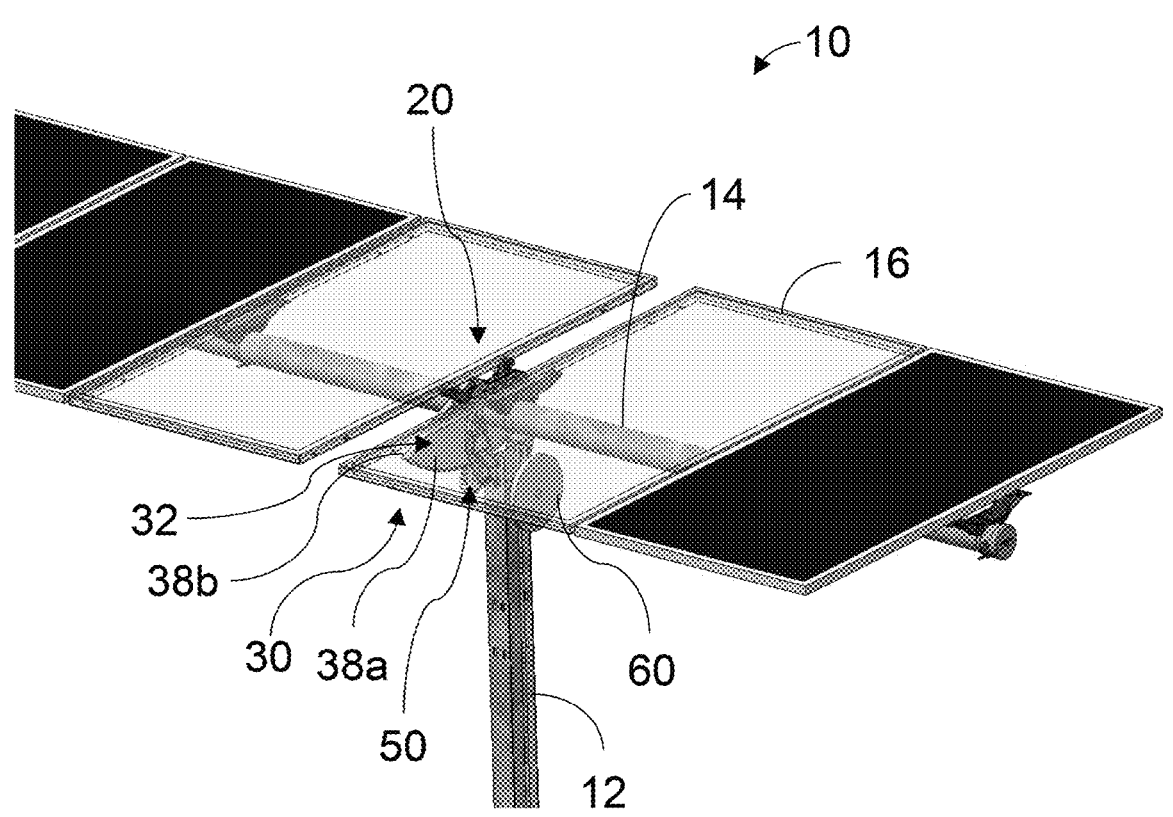
FIG. 2 is a perspective view of the solar tracker of FIG. 1 including an inerter assembly provided in accordance with the present disclosure.
Figure 3:
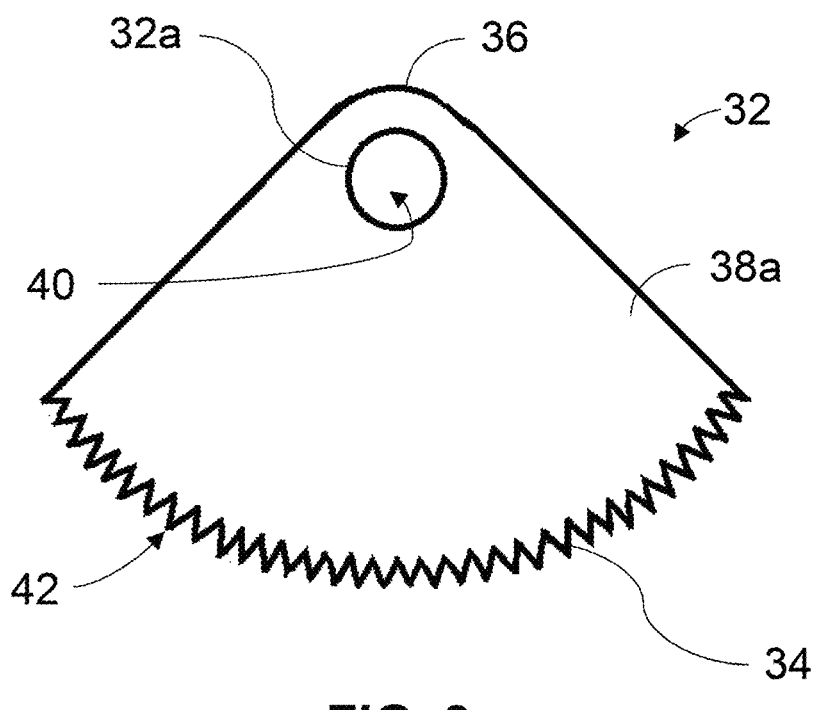
FIG. 3 is a front view of a drive gear of the inerter assembly of FIG. 2.
Figure 4:
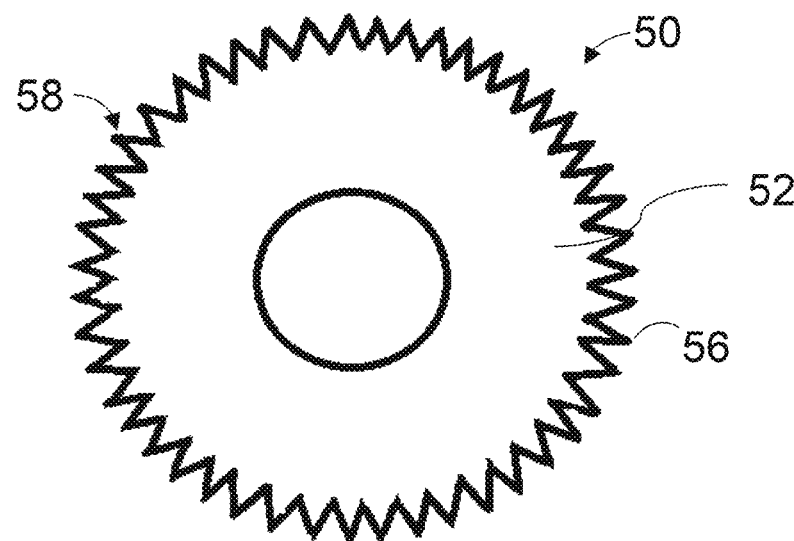
FIG. 4 is a front view of a driven gear of the inerter assembly of FIG. 2.
Figure 5:
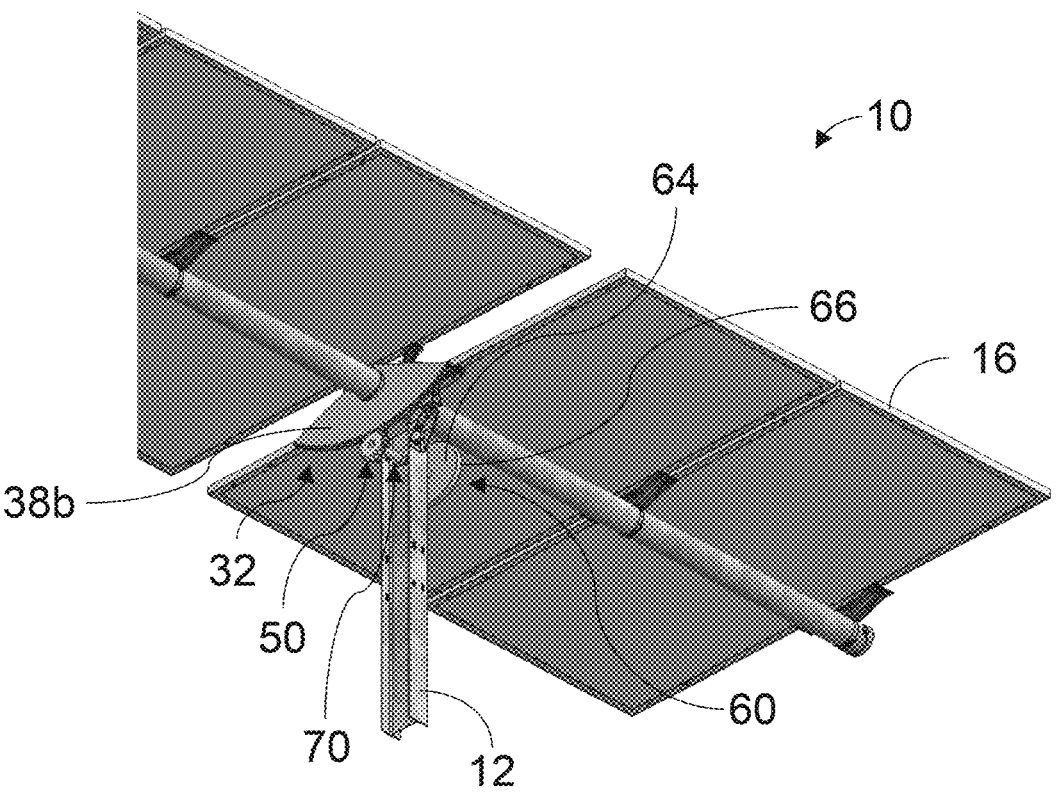
FIG. 5 is a bottom, perspective view of the solar tracker of FIG. 1.
Figure 6:
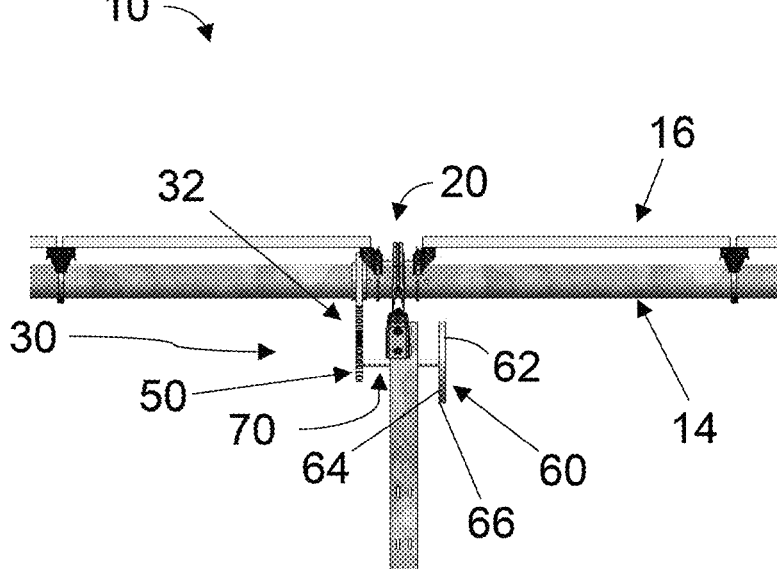
FIG. 6 is an elevation view of the solar tracker of FIG. 1.
Figure 7:
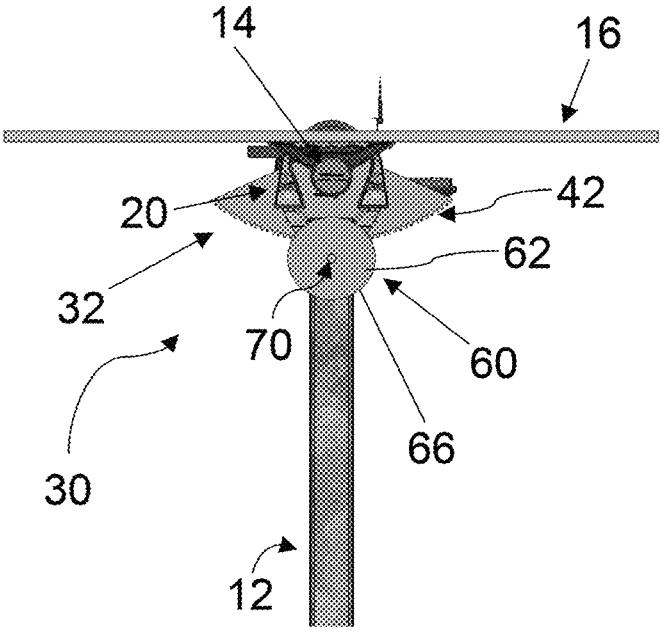
FIG. 7 is a side view of the solar tracker of FIG. 1.

The present disclosure is directed to mass inerter systems for increasing solar tracker stability due to wind loads. The wind stability of solar tracker systems can be affected by several variables. A structure that flexes or otherwise changes position enough due to wind loadings such that the motion of the structure alters the wind flow passing over and/or around it is considered to be aeroelastic. If the flex or change in position of the structure increases the amount of flex or change in position (e.g., increases in amplitude), the structure is considered to be unstable due to aeroelastic dynamic instability caused by the wing shape profile of the structure. As can be appreciated, this dynamic instability can happen at wind speeds that are well below a 300-year return period wind speed.

The mass inerter systems described herein mitigate dynamic instability due to wind speeds and increase solar tracker stability. The mass inerter systems described herein may include a dampening function. In one embodiment, the mass inerter system or mass inerter assembly includes a drive mechanism operably coupled to a torque tube of the solar tracker, a driven mechanism meshingly engaged with the drive mechanism, and a flywheel operably coupled to the drive mechanism. In some cases, the drive mechanism may be considered to be a drive gear. In some cases, the driven mechanism may be considered to be a driven gear. The drive gear may be considered to be a gear sector, such that the drive gear includes a profile similar to that of a sector of a circle, the drive gear having an arcuate side surface defining a plurality of teeth. The driven gear is coupled to a drive shaft that is rotatably supported on a pier of the solar tracker such that rotation of the drive gear effectuates a corresponding rotation of the driven gear. The flywheel is coupled to the drive shaft and is caused to be rotated by rotation of the driven gear. As can be appreciated, the material and/or dimensions of the flywheel affects its moment of inertia, which initially inhibits or otherwise resists rotation. Continued rotation of the flywheel increases its angular momentum and stores energy (e.g., kinetic energy) which causes the flywheel to resist being rotated in a second, opposite direction, imparting a damping effect that reduces vibrations and other dynamic forces acting upon the flywheel and solar tracker.

The moment of inertia of the flywheel imparts a damping effect on objects coupled thereto. In this manner, as wind loads are applied to the solar panels of the solar tracker, vortexes and other aerodynamic forces act upon the solar panels causing the solar panels and the torque tube to flex. Flexing of the solar panels and the torque tube cause oscillations (e.g., excitation) or other vibrations to act on the solar panels and the torque tube. These oscillations or rotational movement by the torque tube cause the drive gear to likewise rotate, which effectuates a corresponding rotation of the driven gear. Due to the gear ratio of the drive gear and the driven gear being greater than 1:1, the driven gear is caused to be rotated a greater amount than the rotation of the drive gear. Rotation of the driven gear effectuates a corresponding rotation of the flywheel, whose inertia initially resists rotation caused by rotation of the torque tube due to excitation to be minimized. As the flywheel rotates, the flywheel stores kinetic energy and has angular momentum corresponding to its rotational speed, overall shape, and mass. As can be appreciated, as the excitation of the solar panels and the torque tube cause the torque tube to be rotated in a second, opposite direction, the angular momentum and kinetic energy of the flywheel resists this change in rotation and imparts a force on the drive gear via the driven gear. The resistance to the change in rotational direction by the flywheel minimizes or otherwise dampens oscillations of the solar panels and torque tube, reducing solar tracker excitation and thereby reducing the loads imparted on the solar tracker due to wind loading.

In embodiments, the drive gear may be a gear rack that is meshingly engaged to the driven gear. It is envisioned that the drive gear or gear rack may be operably coupled to a gear train to obtain a desired gear ratio and therefore, a desired rotational speed of the flywheel. The gear rack may be operably coupled to a solar panel or the torque tube, such that rotation of the torque tube or solar panel effectuates linear translation of the gear rack, which in turn, effectuates rotation of the driven gear. It is envisioned that the gear rack may be a ball screw and the flywheel may be a ball screw nut operably coupled to the ball screw. In one embodiment, the ball screw nut is rotatably supported and translatably fixed to the pier of the solar tracker. In this manner, rotation of the torque tube or solar panel effectuates linear translation of the ball screw relative to the ball screw nut, which in turn, effectuates rotation of the ball screw nut and the storage of kinetic energy. In another embodiment, the ball screw nut is rotatably supported by the torque tube or solar panel and the ball screw is coupled to the pier. In this manner, rotation of the torque tube or solar panel effectuates linear translation of the ball screw nut relative to the ball screw, which in turn, effectuates rotation of the ball screw nut and the storage of kinetic energy. These and other aspects of the present disclosure will be described in further detail herein.

Referring now to the drawings, a solar tracker provided in accordance with the present disclosure is illustrated in FIG. 1 and generally identified by reference numeral 10. The solar tracker 10 includes a plurality of piers 12 disposed in spaced relation to one another and embedded in the earth. A torque tube 14 extends between each adjacent pier 12 and is rotatably supported on each pier 12. The solar tracker 10 includes a plurality of solar panels 16 supported on each respective torque tube 14. The span between two adjacent piers 12 is referred to as a bay 18 and may be generally in the range of about 8 meters in length. A plurality of solar trackers 10 may be arranged in a north-south longitudinal orientation to form a solar array.

The solar tracker 10 includes at least one slew drive 20 operably coupled to the torque tube 14 and supported on a respective pier of the plurality of piers 12. The slew drive 20 effectuates rotation of the torque tube 14, which effectuates a corresponding rotation of the solar panels 16 to track the location of the sun. The solar tracker 10 includes a plurality of bearing housing assemblies (BHA) 22 disposed on respective piers of the plurality of piers 12. Each of the plurality of bearing housing assemblies 22 is operably coupled to the torque tube 14 to rotatably support the torque tube 14 therein as the torque tube 14 is caused to be rotated by the slew drive 20.

With reference to FIGS. 2-7, the solar tracker 10 includes at least one mass inerter assembly 30 operably coupled to the torque tube 14 and supported on a respective pier of the plurality of piers 12. The mass inerter assembly 30 includes a drive mechanism, such as a drive gear 32, a driven mechanism, such as a driven gear 50, and a flywheel 60.

The drive gear 32 defines a sector profile, such as a sector of a circle, having an arcuate side surface 34 disposed opposite an apex 36. The drive gear 32 defines an inner surface 32a extending between opposed first and second end surfaces 38a and 38b, respectively. The inner surface 32a defines a through-bore 40 disposed adjacent the apex 36 that is configured to receive a portion of the torque tube 14 therein. It is envisioned that the drive gear 32 may be coupled to the torque tube 14 using any suitable means to inhibit rotation of the drive gear 32 relative to the torque tube 14 (e.g., the drive gear 32 and the torque tube 14 rotate in unison), such as welding, adhesives, fasteners, friction fit, interference fit, amongst others. The arcuate side surface 34 of the drive gear 32 defines a plurality of teeth 42 therein extending through each of the first and second end surfaces 38a, 38b. As can be appreciated, the length of the arcuate side surface 34, and therefore, the number of teeth of the plurality of teeth 42, may be altered depending upon the design needs of the mass inerter assembly 30. In one non-limiting embodiment, the arcuate side surface 34 includes a length that is configured to rotate the flywheel 60 at a ratio that is greater than 1:1 (e.g., the flywheel 60 is caused to spin faster than the drive gear 32 as the drive gear 32 is rotated). It is envisioned that the drive gear 32 may be formed from any suitable material, such as a metallic material (e.g., steel, aluminum, etc.), a non-metallic material (e.g., polymers, ceramics, etc.), and combinations thereof, and may be formed using any suitable process, such as casting, machining, additive manufacturing, amongst others.

In this embodiment, we still have a drive mechanism that rotates with the rotation of the torque tube. In this embodiment, though, the drive gear is not distributed about the central axis of the torque tube and/or may not be coaxial with the central axis of the elongate torque tube. In one aspect of this design, the solar tracker includes a plurality of bearing housing assemblies (BHA) disposed on respective piers of the plurality of piers. Such a design is disclosed in co-owned U.S. Patent App. Ser. No. 63/466,980, entitled "Support Structures for Solar Trackers," hereby incorporated by reference in its entirety.

In such design, each of the plurality of bearing housing assemblies is operably coupled to a torque tube to rotatably support the torque tube. The bearing housing assembly is rotatably supported by a pivot, which may be a pin or other rotatable component. The rotational axis of the pin is offset from the center axis of the torque tube.

In such instance, the drive mechanism may be distributed about the pin or be axially connected thereto such that rotation of the bearing housing assembly (and therefore the torque tube) about the pin also rotates the drive mechanism.

Continuing with FIGS. 2-7, the driven gear 50 defines a generally circular profile having a first side surface 52 and an opposing second side surface extending between an outer surface 56, the second side surface generally identical to the first side surface 52. The outer surface 56 includes a plurality of teeth 58 disposed thereon that is configured to mesh with or otherwise engage the plurality of teeth 42 of the drive gear 32 such that rotation of the drive gear 32 effectuates rotation of the driven gear 50 and forces imparted on the driven gear 50 are transmitted to the drive gear 32.

The flywheel 60 defines a generally circular profile having opposed first and second side surfaces 62, 64 extending between an outer surface 66. Although generally described as having a generally circular profile, it is envisioned that the flywheel 60 may include any suitable profile without departing from the scope of the present disclosure. The flywheel 60 includes an outer dimension, a thickness, and a weight that may be varied depending upon the design needs of the solar tracker 10 and/or the mass inerter assembly 30. As can be appreciated, the dimensions and/or material from which the flywheel 60 is formed to increase or decrease the moment of inertia of the flywheel 60. In this manner, the moment of inertia of the flywheel 60 inhibits or otherwise initially resists rotation. Continued rotation of the flywheel 60 increases its angular momentum and stores energy (e.g., kinetic energy) which causes the flywheel 60 to resist being rotated in a second, opposite direction, imparting a damping effect that reduces vibrations and other dynamic forces acting upon the flywheel 60 and other components coupled thereto.

The flywheel 60 is coupled to the driven gear 50 such that rotation of the driven gear 50 effectuates a corresponding rotation of the flywheel 60. It is envisioned that the driven gear 50 may be coupled to the flywheel 60 using any suitable means, and in one non-limiting embodiment, the driven gear 50 is coupled to the flywheel 60 by a drive shaft 70. The drive shaft 70 is rotatably supported within a portion of the pier 12 using any suitable means, such as bearings, bushings, amongst others. The drive shaft 70 is coupled to each of the driven gear 50 and the flywheel 60 using any suitable means, such as welding, adhesives, fasteners, friction fit, interference fit, etc. Although generally described as being rotatably supported by the pier 12 and fixedly secured to each of the driven gear 50 and the flywheel 60, it is envisioned that the drive shaft 70 may be fixedly coupled to the pier 12 using any suitable means, such as fasteners, adhesives, friction fit, interference fit, etc. and the driven gear 50 and the flywheel 60 may be rotatably supported on the drive shaft 70 using any suitable means, such as bearings, bushings, amongst others.

While it is described herein that the drive gear 32 and the driven gear 50 effectuate a rotation of the flywheel 60, it may be contemplated that the flywheel 60 may be rotated via other drive mechanisms and/or driven mechanisms such as, for example, a chain and a sprocket assembly, a belt and a pulley assembly, a cable and a grooved wheel assembly, a capstan drive assembly, or the like. For example, in a chain and sprocket assembly embodiment, then the drive gear is replaced with a first sprocket, the driven gear is replaced with a second sprocket, and the chain functions as either part of the drive sprocket, driven sprocket, or an intermediary between the two sprockets. In a belt and pulley embodiment, the drive gear is replaced with a drive pulley, the driven gear is replaced with a driven pulley, and the belt functions as either part of the drive pulley, driven pulley, or an intermediary between the two pulleys. In a cable and grooved wheel embodiment, the drive gear is replaced with a first grooved wheel, the driven gear is replaced with a second grooved wheel, and the cable functions as either part of the first grooved wheel, the second grooved wheel, or an intermediary between the two grooved wheels. In a capstan embodiment, the drive gear is replaced with a rotating drum, similar to that of a capstan on a ship. A rope or cable may be coupled to the driven gear, or directly coupled to the flywheel. The rope/cable functions as either part of the rotating drum, the flywheel, or an intermediary between the rotating drum and the flywheel. Moreover, the gear ratios discussed relative to the drive gear and the driven gear would apply equally to similar ratios between the drive sprocket and driven sprocket, drive pulley and driven pulley, first grooved wheel and the second grooved wheel, and the rotating drum and the driven wheel and/or the flywheel.

As described hereinabove, the moment of inertia of the flywheel 60 imparts a damping effect on objection coupled thereto. In this manner, as wind loads are applied to the solar panels 16 of the solar tracker 10, vortexes and other aerodynamic forces act upon the solar panels 16 causing the solar panels 16 and the torque tube 14 to flex. Flexing of the solar panels 16 and the torque tube 14 cause oscillations (e.g., excitation) or other vibrations to act on the solar panels 16 and the torque tube 14. These oscillations or rotational movement by the torque tube 14 causes the drive gear 32 to likewise rotate, which effectuates a corresponding rotation of the driven gear 50. Due to the gear ratio of the drive gear 32 and the driven gear 50 being greater than 1:1, the driven gear 50 is caused to be rotated a greater amount than the rotation of the drive gear 32. Rotation of the driven gear 50 effectuates a corresponding rotation of the flywheel 60, whose inertia initially resists rotation caused by rotation of the torque tube 14 due to excitation to be minimized. As the flywheel 60 rotates, the flywheel 60 stores kinetic energy and has angular momentum corresponding to its rotational speed, overall shape, and mass. As can be appreciated, as the excitation of the solar panels 16 and the torque tube 14 cause the torque tube 14 to be rotated in a second, opposite direction, the angular momentum and kinetic energy of the flywheel 60 resists this change in rotation and imparts a force on the drive gear 32 via the driven gear 50. The resistance to the change in rotational direction by the flywheel 60 minimizes or otherwise dampens oscillations of the solar panels 16 and torque tube 14, reducing solar tracker excitation and thereby reducing the loads imparted on the solar tracker 10 due to wind loading.

Figure 8:
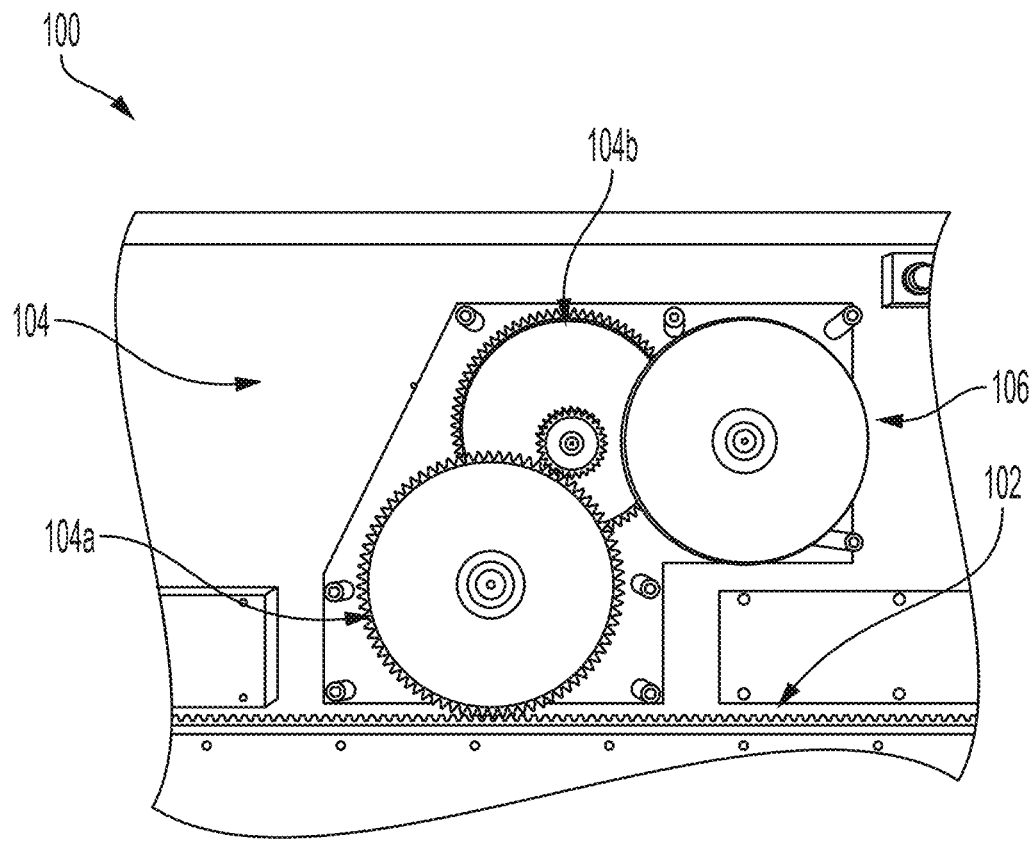
FIG. 8 is an elevation view of another embodiment of a inerter assembly provided in accordance with the present disclosure.

Turning to FIG. 8, another embodiment of a mass inerter assembly provided in accordance with the present disclosure is illustrated and generally identified by reference numeral 100. The mass inerter assembly 100 includes gear rack 102, a gear train 104, and a flywheel 106. The gear rack 102 is operably coupled to a portion of one of the solar panels 16 or the torque tube 14 such that rotation of the solar panels 16 and/or torque tube 14 effectuates a corresponding linear movement of the gear rack 102. The gear rack 102 includes a plurality of teeth that mesh with or otherwise engage a corresponding plurality of teeth disposed on a first gear 104a of the gear train 104. The gear train 104 is operably coupled to a portion of the pier 12 such that the gear rack 102 translates relative thereto. Linear movement of the gear rack 102 effectuates rotation of the first gear 104a (e.g., a rack and pinion arrangement), which in turn, effectuates rotation of the flywheel 106. In embodiments, the gear train may include an intermediary gear 104b meshingly engaged with the first gear 104a and operably coupled to the flywheel 106. As can be appreciated, the gear train 104 may include any suitable number of gears that form a gear ratio of greater than 1:1 between the gear rack 102 and the flywheel 106, such that the flywheel 106 is caused to be rotated faster than the linear movement of the gear rack 102.

Figure 9:
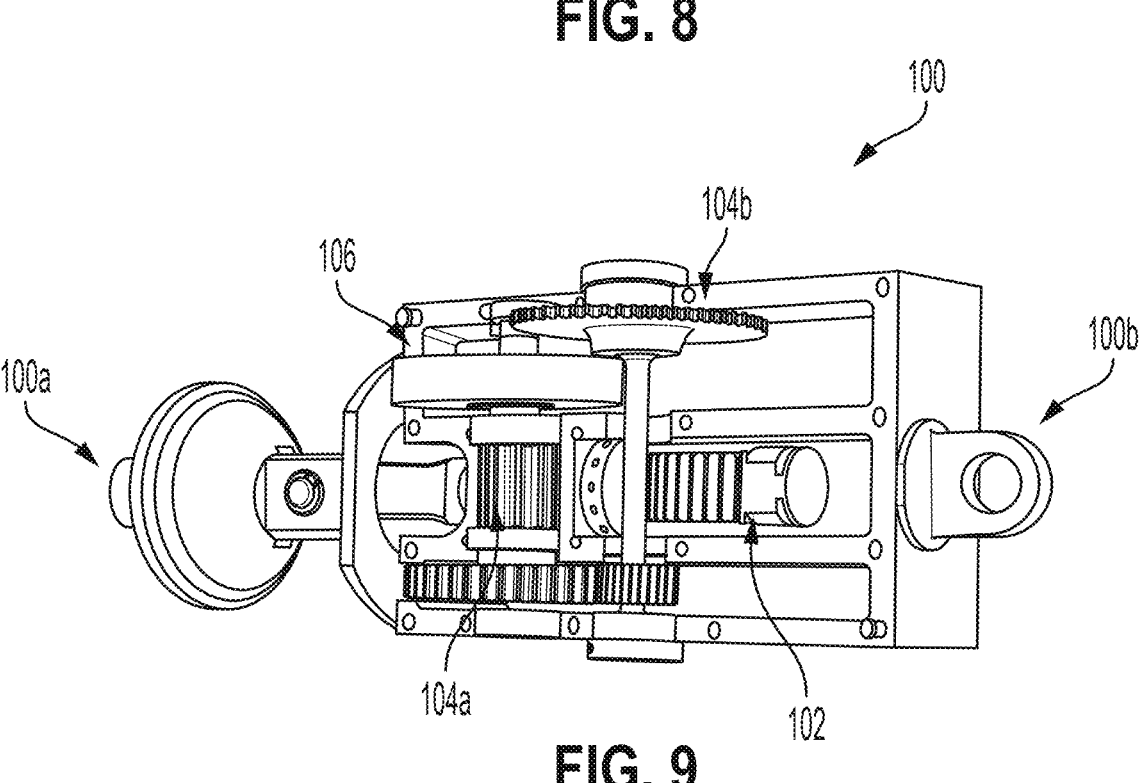
FIG. 9 is a perspective view of the inerter assembly of FIG. 8.
Figure 10:
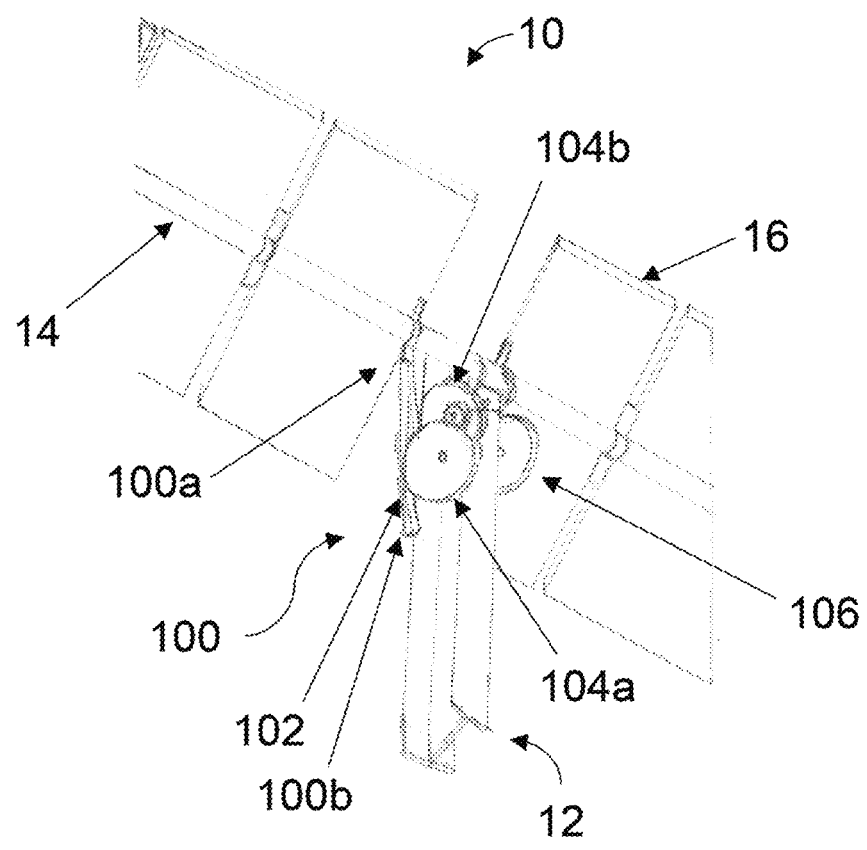
FIG. 10 is a bottom, perspective view of a solar tracker including the inerter assembly of FIG. 8.

With reference to FIGS. 9 and 10, in embodiments, it is envisioned that the mass inerter assembly 100 may be linearly arranged such that a first end portion 100a of the mass inerter assembly 100 is operably coupled to a portion of the torque tube 14 or solar panel 16 and a second, opposite end 100b of the mass inerter assembly 100 is operably coupled to a portion of the pier 12 such that movement of the torque tube 14 and/or solar panel 16 causes the mass inerter assembly 100 to expand or contract in length depending upon the direction in which the torque tube 14 and/or solar panel 16 is rotating. As can be appreciated, this contraction and expansion of the mass inerter assembly 100 effectuates rotation of the flywheel 106, which as described hereinabove, mitigates excitation of the solar tracker due to wind loading.

Figure 11:
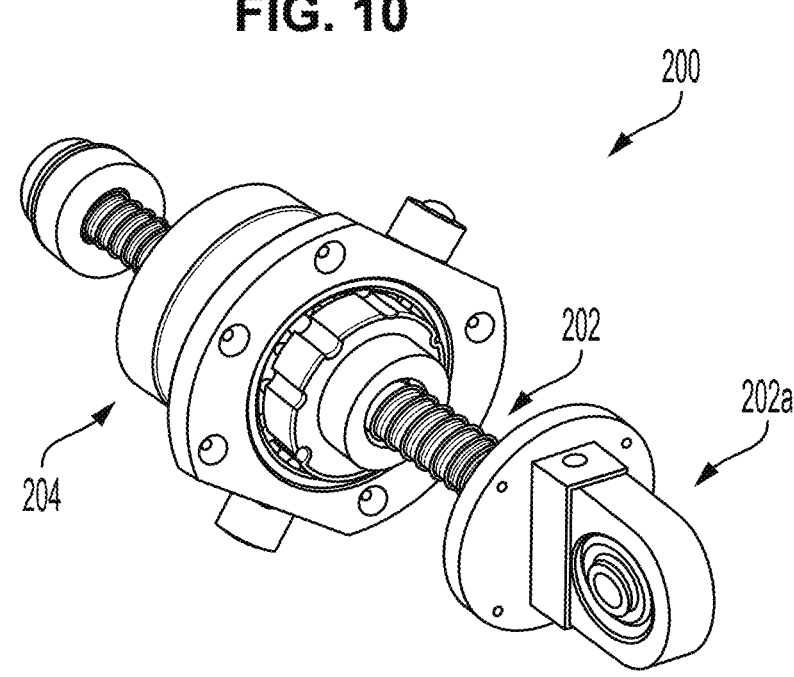
FIG. 11 is perspective view of yet another embodiment of a inerter assembly provided in accordance with the present disclosure.
Figure 12:
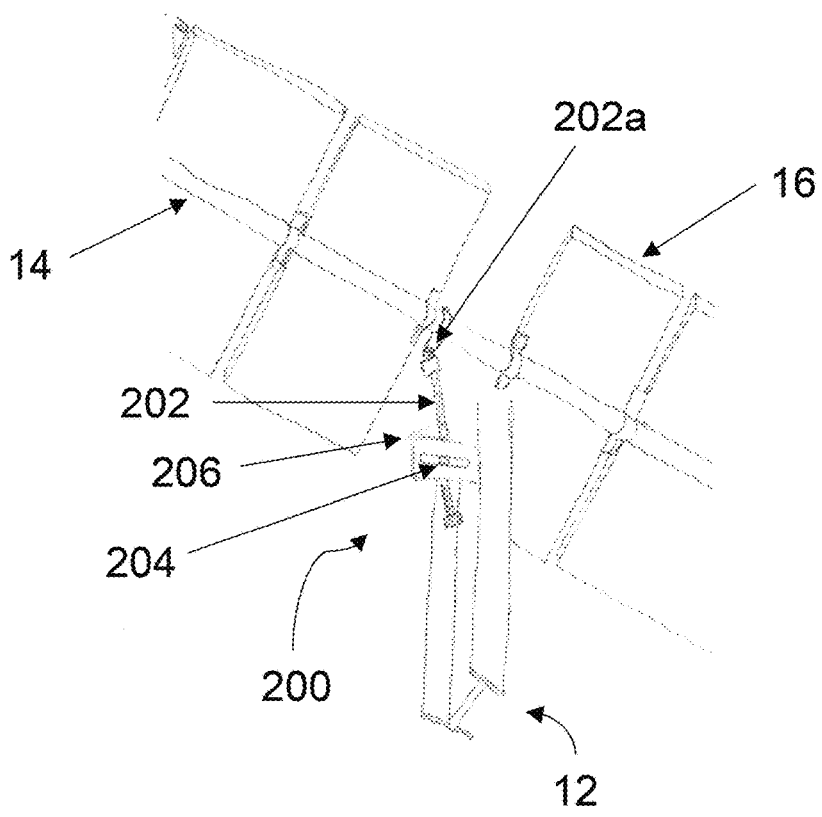
FIG. 12 is a bottom, perspective view of a solar tracker including the inerter assembly of FIG. 11.

With reference to FIGS. 11 and 12, another embodiment of a mass inerter assembly is illustrated and generally identified by reference numeral 200. The mass inerter assembly 200 includes a ball screw 202, lead screw, or other suitable helical linear actuator arrangement and a corresponding ball screw nut 204 or shuttle threadably engageable with the ball screw 202. The ball screw nut 204 is rotatably supported on the pier 12 using any suitable means, such as an enclosure 206, cage, or other suitable means permitting the ball screw nut 204 to rotate therewithin and inhibit linear translation of the ball screw nut 204 along the pier 12. In this manner, a first end portion 202a of the ball screw 202 is operably coupled to a portion of the solar panel 16 or torque tube 14, such that rotation of the solar panel 16 or torque tube 14 causes the ball screw 202 to be linearly translated within the ball screw nut 204. Linear translation of the ball screw 202 relative to the ball screw nut 204 causes threads of the ball screw 202 to engage corresponding threads on the ball screw nut 204 and cause the ball screw nut 204, and therefore, the flywheel, to rotate within the enclosure and generate momentum and store kinetic energy. In embodiments, the ball screw nut 204 may be the flywheel.

Figure 13:
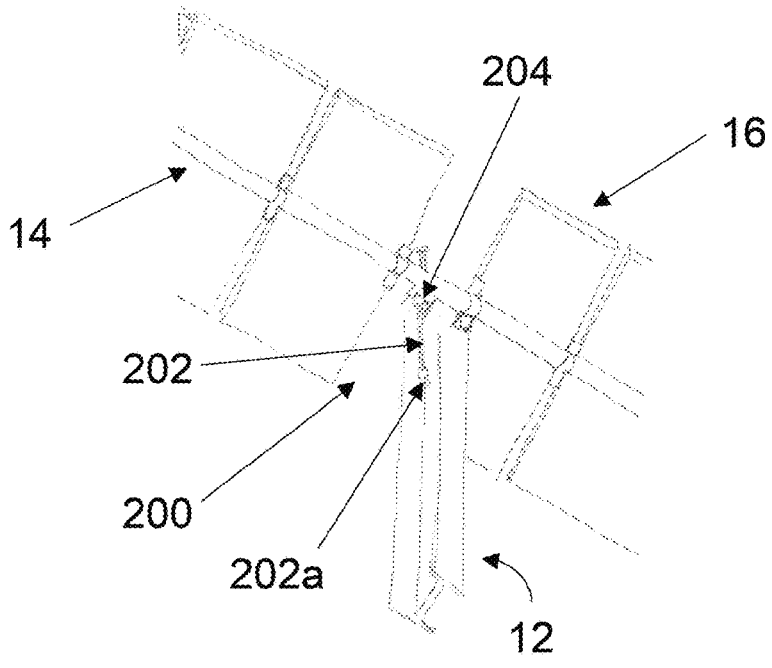
FIG. 13 is a bottom, perspective view of another embodiment of a solar tracker including the inerter assembly of FIG. 12.

With reference to FIG. 13, in embodiments, the first end portion 202a of the ball screw 202 may be coupled to the pier 12 and inhibited from translating along its longitudinal axis relative to the pier 12. In this manner, the ball screw nut

204 may be rotatably and translatably supported on a portion of the solar panel 16 or torque tube 14 such that as the solar panel 16 or torque tube 14 is caused to rotate, the ball screw nut 204 is linearly translated over the ball screw 202, which in turn, effectuates rotation of the ball screw nut 204 and the storage of kinetic energy within the ball screw nut 204. It is envisioned that the ball screw nut 204 may be rotatably and translatably supported on the solar panel 16 or torque tube 14 using any suitable means without departing from the scope of the present disclosure.

It is envisioned that the mass inerter assemblies 100, 200 may replace existing linear dampers disposed on the solar tracker 10. In this manner, existing linear dampers may be removed from the solar tracker 10 and the mass inerter assembly 100, 200 may directly replace the linear dampers, utilizing the existing anchor points to which the linear dampers were coupled. It is contemplated that a combination of linear dampers and mass inerter assemblies 100, 200 may be utilized over a length of the solar tracker 10 depending upon the design needs of the solar tracker 10.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments.

Various examples have been described. These and other examples are within the scope of the following claims.

The invention claimed is:

1. A solar tracking system, comprising:
a pier;
a torque tube rotatably supported on the pier;
a solar module coupled to the torque tube, wherein rotation of the torque tube effectuates a corresponding rotation of the solar module; and
an inerter, the inerter including:
a drive mechanism operatively coupled to the torque tube, wherein rotation of the torque tube effectuates movement of the drive mechanism;
a driven mechanism operably coupled to the drive mechanism, wherein movement of the drive mechanism effectuates movement of the driven mechanism; and
a flywheel operably coupled to the driven mechanism and configured to store and release kinetic energy, wherein movement of the driven mechanism effectuates rotation of the flywheel, wherein a ratio of the drive mechanism to the driven mechanism is greater than 1:1 such that the drive mechanism is configured to cause the driven mechanism and the flywheel to move faster than the movement of the drive mechanism, wherein the inerter is configured such that, when the torque tube is rotated in a first direction, the driven mechanism causes the flywheel to rotate and store kinetic energy, and wherein the inerter is configured such that, when a wind loading on the solar module effectuates rotation of the torque tube in a second, opposite direction, the flywheel is configured with a moment of inertia and stored kinetic energy to resist rotation of the torque tube in the second direction to mitigate excitation of the solar tracking system.

2. The solar tracking system according to claim 1, wherein the drive mechanism is a drive gear and the driven mechanism is a driven gear.

3. The solar tracking system according to claim 2, wherein the ratio is a gear ratio, and wherein the gear ratio of the drive gear to the driven gear is greater than 1:1.

4. The solar tracking system according to claim 2, wherein the drive gear defines a sector profile having an arcuate side surface, the arcuate side surface defining a plurality of teeth engageable with the driven gear.

5. The solar tracking system according to claim 2, wherein the drive gear is a gear rack, wherein linear motion of the gear rack effectuates movement of the driven gear via a gear train.

6. The solar tracking system according to claim 2, wherein the drive gear is a ball screw and the flywheel is a ball screw nut, wherein linear motion of the ball screw effectuates rotation of the ball screw nut.

7. The solar tracking system according to claim 1, further comprising a plurality of gears, the plurality of gears in mechanical communication with the drive mechanism and the flywheel, such that rotational speed of the flywheel is greater than a rotational speed of the drive mechanism.

8. The solar tracking system according to claim 2, wherein the driven gear is supported on the pier.

9. The solar tracking system according to claim 1, wherein the flywheel is rotatably supported on the pier.

* * * * *